No. 720,606. PATENTED FEB. 17, 1903.
J. F. McELROY.
ELECTRIC LIGHTING SYSTEM.
APPLICATION FILED SEPT. 14, 1901.
NO MODEL. 2 SHEETS—SHEET 1.

UNITED STATES PATENT OFFICE.

JAMES F. McELROY, OF ALBANY, NEW YORK.

ELECTRIC-LIGHTING SYSTEM.

SPECIFICATION forming part of Letters Patent No. 720,606, dated February 17, 1903.

Application filed September 14, 1901. Serial No. 75,419. (No model.)

*To all whom it may concern:*

Be it known that I, JAMES F. MCELROY, a citizen of the United States, residing at Albany, county of Albany, State of New York, have invented certain new and useful Improvements in Electric-Lighting Systems, of which the following is a specification showing that form of my invention which now seems to me the best, reference being made to the accompanying drawings, wherein—

Figure 1:
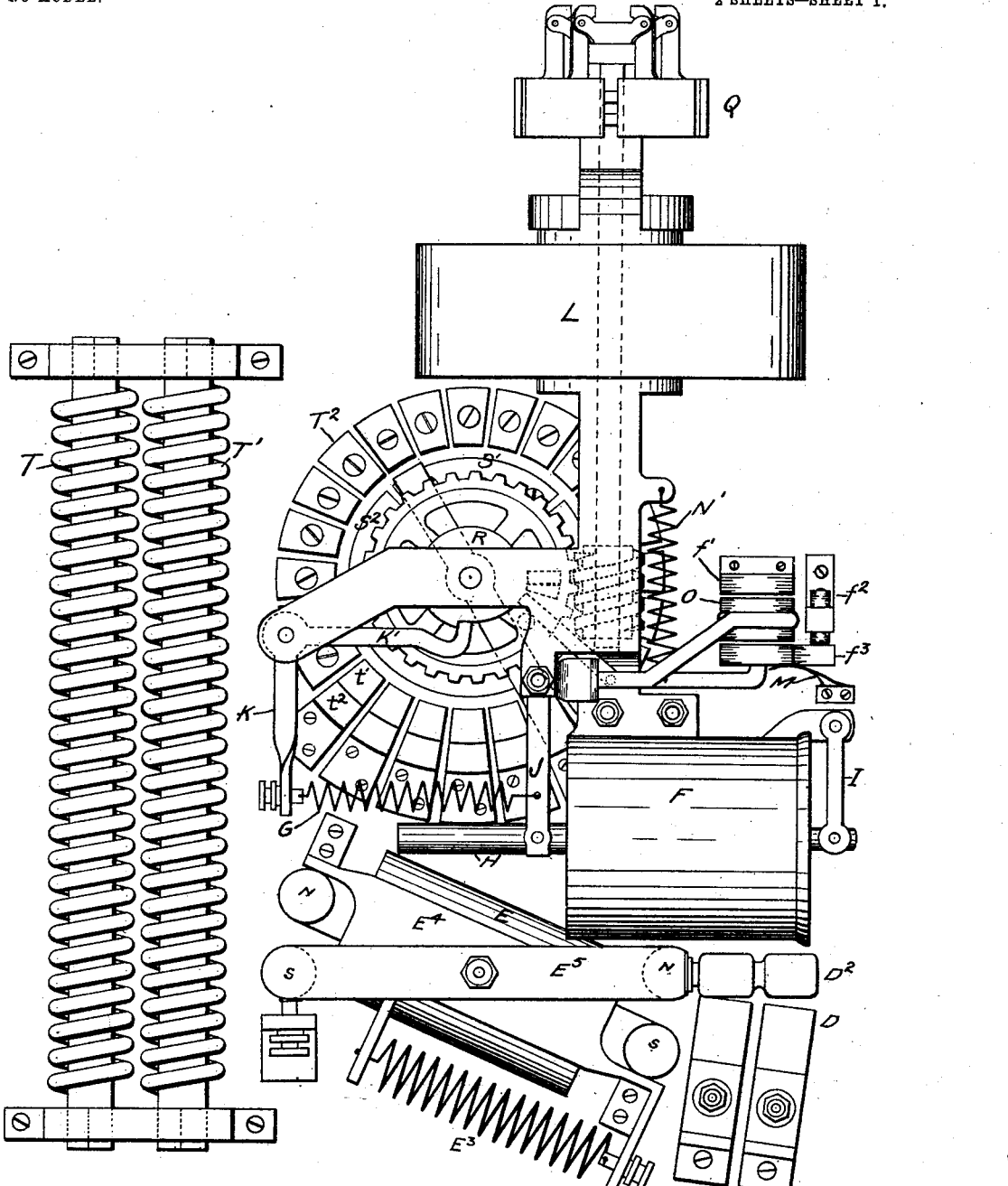
Figure 2:
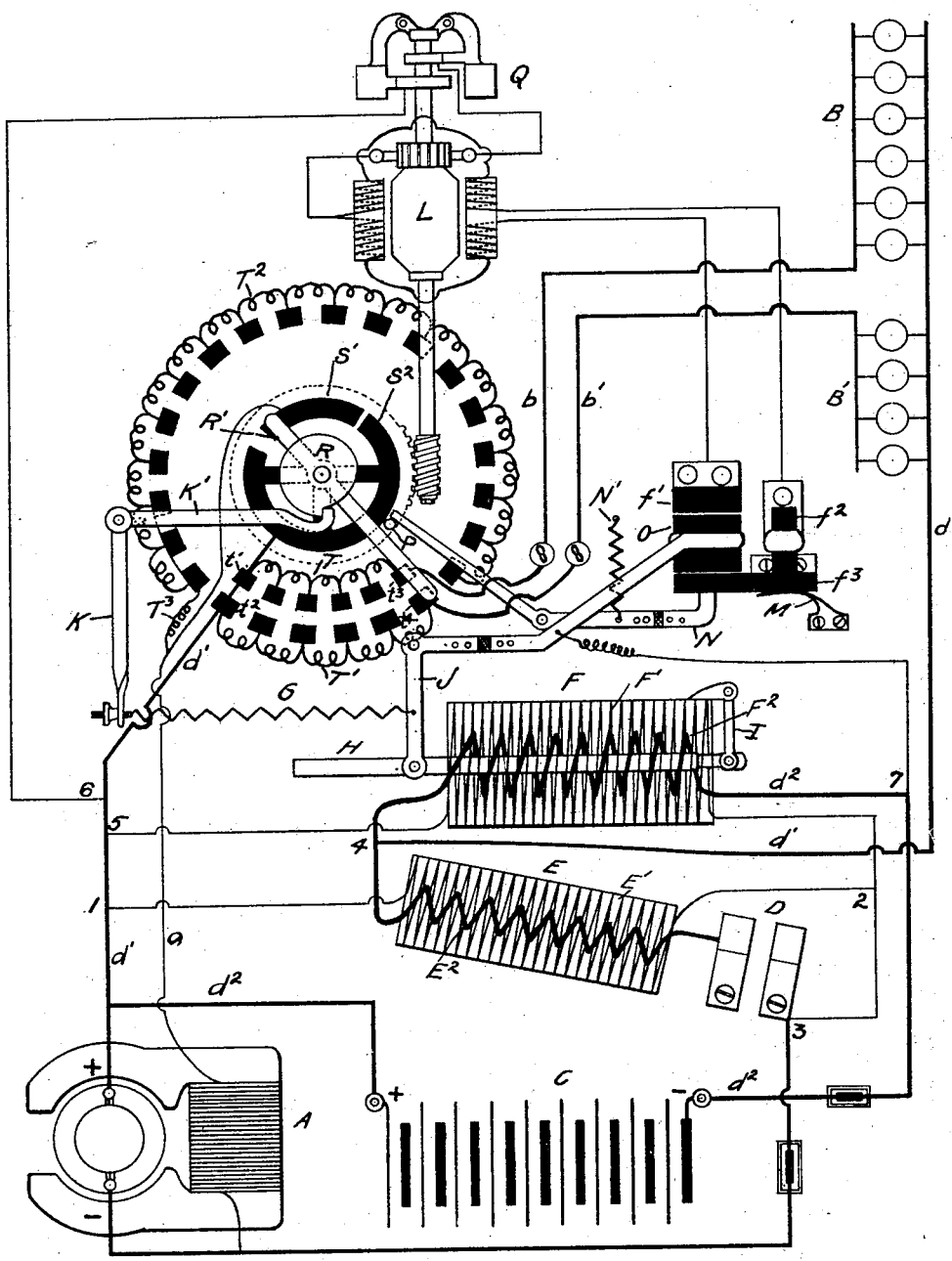

Figure 1 is an elevation of the actual apparatus. Fig. 2 is a diagram of the circuits thereof.

Similar characters refer to similar parts throughout both views.

My invention relates to certain improvements in electric-lighting systems of the kind wherein the generator is driven at an intermittent and variable rate of speed—as, for instance, when it is connected to an axle of a railway-train and in which a storage battery is employed to operate the electric lamps when the generator is stopped or running at a low rate of speed, which battery is also charged by the generator, the lamps being operated a large portion of the time by the generator directly. In a system of this type heretofore devised by me I have employed a generator driven by a car-axle and adapted to be connected when its speed reached the proper point to a constant-potential circuit on the vehicle to which the lamps and a storage battery were connected in multiple. To insure the connection of the machine to the circuit at the proper instant, I provided a line-switch adapted to be closed by the action of a potential-magnet permanently connected to the circuit on the dynamo side of the said switch, so as to respond to the potential of the machine. To open the switch again when the train speed falls, the potential-coil is also provided with a series coil between the battery and dynamo, which coil coöperates with the potential-coil so long as the dynamo-pressure preponderates over that of the battery, but opposes the potential-coil when the dynamo-pressure falls below that of the battery, with a consequent reversal of the direction of current flow in the series coil. This opposing action of the series coil, together with the drop in the pressure or potential as the speed drops, causes the potential-coil to release the switch and disconnect the dynamo from the line. In a similar manner I have provided for the regulation of the machine to compensate for speed variations by using a potential-magnet as the determining factor controlling the adjustment of the excitation. This potential-magnet may be adjusted to respond to a given potential and will thereupon act to set in operation regulating agencies which will reduce the potential of the machine if it has risen above the given or standard electromotive force and increase its potential if it has fallen below that standard. It does this by increasing or reducing the resistance of the field-magnet circuit of the dynamo as the speed increases or decreases, so as to maintain the potential generated by the machine constant. My system also involved the employment of a dynamo whose field-magnet strength was dependent only upon potential and not upon the volume of current flowing in the armature. Manifestly the current is a variable quantity, dependent upon the number of lamps there may happen to be in circuit and also upon the amount which may be required by the battery at any given instant. The potential, however, is a fixed or constant quantity, and if so maintained the current will take care of itself and will be always of an amount commensurate with the service required at any particular time. It is therefore not feasible with a variable-speed generator to make the excitation of the field-magnet commensurate with the armature-current—as, for instance, by passing such current through a field-magnet coil in series with the armature in such a manner as to vary the excitation in accordance with the volume of armature-current. While this might give an excitation proportional to the load for one fixed rate of speed, such relation would be immediately disturbed by a change of speed. Moreover, machines having series field-magnet coils are extremely likely to be reversed by the storage battery or to be so nearly reversed as to be injured by an excessive counter-current from the battery. I have therefore employed in my system a single field-magnet coil, preferably a shunt-coil, with the current therein regulated according to the potential of the system, preferably by means of a rheostat in series with said shunt-coil and controlled by a potential-magnet.

Another feature of my system has been the adjustment of the standard potential to meet the varying conditions of the storage battery by winding a few turns of large wire upon the potential-regulating magnet, through which coil is passed that portion of the generated current which flows to the battery. This adjusting-coil coöperates with the shunt-coil of the magnet to make it respond to a somewhat lower standard potential when the charging of the battery begins and a heavy current tends to flow through the battery and also through the adjusting-coil, while as the battery becomes more fully charged and its counter electromotive force increases a smaller current will pass through the adjusting-coil and the magnet will respond to a somewhat higher voltage, and finally when the battery is completely charged no current will pass in the adjusting-coil and its modifying effect on the potential-coil ceases.

Still another feature of my system has been the use of a motor to operate the field-magnet rheostat, the action of the motor being controlled by the potential-magnet. I arranged this motor so that it would be operated from the storage battery by connecting it to the circuit on the battery side of the main switch, so that if the dynamo should suddenly stop and its connection with the circuit be broken the motor would still be operated by the battery and run the rheostat to the off position, which is the required position for the dynamo when it again comes into action. In connection with this feature I have provided that when the motor is thus operated by the storage-battery current it will break its own circuit when the rheostat reaches the off position, so that the battery may not be left connected with the motor, and thereby lose its charge by leakage through the motor in the event of the car being left standing for a considerable length of time. In order that the motor might not be left with its circuit thus open and incapable of working, I arranged that the potential-magnet should reclose the motor-circuit when the dynamo starts up and its potential reaches the standard value or approximately that value.

Another feature of my system has been the operation of lamps and battery in multiple upon the same generator-circuit, but at different potentials, the battery taking the normal line-potential and the lamps taking a somewhat lower potential by reason of a potential-reducing device, such as a resistance, included in the lamp-circuit and in series with the lamps. By this means the extra pressure applied to the batteries will overcome the internal resistances of the batteries and permit an adequate charging-current to flow into them and put the batteries in such condition that should the dynamo be disconnected they would be able to supply the lamps at the normal lamp-pressure without the intervention of the potential-reducing device. In connection with the feature just mentioned I have also arranged that the differential pressure applied to the lamps and batteries shall not occur when the dynamo first reaches the potential at which it is connected to the circuit, but shall be produced gradually and as the conditions may require. In other words, I start the action of the generator at the lower potential required for the lamps, so that, assuming that the lamps have been working from the battery at their normal potential—for example, sixty volts—I throw in the dynamo at that voltage instead of at the higher voltage—for example, seventy volts—required for charging the battery. This produces no fluctuation in the lamps when the dynamo comes into action, and the dynamo then supplies but very little current, since its pressure is exactly equal to that of the battery. As the speed of the dynamo increases, it having at this point no resistance in its field-magnet circuit, the regulator will naturally start to reduce the potential of the machine; but instead of permitting it to do so I allow the potential to rise slightly, and as this occurs I cause the regulator to introduce resistance into the lamp-circuit and at the same time cause it to adjust the retractile spring of the regulator-magnet so that it will no longer respond to sixty volts, but to a slightly higher voltage—say sixty-two. The machine will then operate at sixty-two volts, which voltage will be applied directly to the battery; but to the lamps it will only be applied through the resistance I have introduced into the lamp-circuit, which will reduce it to the normal lamp-voltage of sixty. As the speed increases still further the regulator throws another section of resistance into the lamp-circuit corresponding to another two volts and automatically adjusts the regulator-magnet to sixty-four. This process is carried on step by step until the dynamo is running at a voltage of seventy, which gives the normal difference of ten volts between the voltage impressed upon the lamps (sixty volts) and that impressed upon the batteries, (seventy volts.) This difference of voltage compels the dynamo to operate the lamps directly and without any draft by the lamps upon the battery. This insures the economy inherent in the direct action of the lamps by the dynamo in distinction from their operation from the battery with the necessary loss involved in the transformation of electric energy into the chemical energy of the battery and the retransformation of it into electrical energy for operating the lamps. Moreover, there is the important advantage of avoiding any flickering of lamps when the dynamo is switched in. As already mentioned, the switching-in occurs at exactly the lamp-potential, and the transference of the lamps from the battery to the dynamo is accomplished by the natural rise of the dynamo-potential as the speed increases and by the simultaneous insertion of the resistance into the lamp-circuit, but not into the battery-circuit. In practice it is impossible to detect by the lamps the moment at which the dynamo is switched in nor to observe the rise of the dynamo-pressure by its subsequent increase of speed.

My present invention involves certain improvements on my above-described system, although the invention may also be employed with other systems where it may prove applicable. It will be evident that for a given fixed resistance in the lamp-circuit the effect of such resistance will be changed with a change in the number of lamps and the consequent change in the amount of current in the lamp-circuit. In other words, the drop in voltage produced by said resistance is denoted by the product of the resistance multiplied by the current, and hence must be different for different currents. I therefore do not vary the resistance to correspond with the number of lamps, as in a device shown in one of my prior applications, but I subdivide the lamps into groups and provide a separate resistance in series with each group. Then I vary the illumination by removing or adding groups of lamps each with its individual resistance. Such an arrangement is particularly suitable for coaches, but is not so well adapted to sleeping-cars, where the lamps should be capable of control individually and not by groups.

Fig. 1 of the accompanying drawings shows the entire mechanism which I employ in my system outside of the dynamo, lamps, and battery, including the improvements of the present invention. Such mechanism is shown in the figure as one-half of the actual size.

Referring to the drawings, A represents the dynamo, which is understood to be suitably connected to and driven by an axle of a car or train or to be otherwise operated at a variable and intermittent speed.

B and B' represent two groups of electric lamps which are to be operated by the dynamo, and C is the storage battery which is to supplement the dynamo, being charged thereby and serving to operate the lamps B B' when the dynamo is disconnected. The dynamo A has a single field-magnet coil in a shunt-circuit $a$ and its armature-circuit is adapted to be connected to the lamps and battery by the line-switch D, whence one branch passes by the wire $d'$ to the lamps B and B' and another branch passes by the wire $d^2$ to the battery C. The dynamo will thus supply the battery and the lamps in multiple, under conditions to be hereinafter described, whenever the switch D is closed.

For closing the switch D, I provide the magnet E, having thereon a potential-coil E' of many turns of fine wire permanently connected in a shunt taken from the main line on the dynamo side of said switch, so as to be unaffected by the opening or the closing of the switch. This shunt-circuit branches from the positive wire of the armature-circuit at the point 1, Fig. 2, and passing thence through the coil to the junction-point 2 it proceeds to join the negative wire of the armature-circuit at a point 3. As shown in Fig. 2, the magnet E is mounted in an inclined position on a bracket $E^4$, while its armature $E^5$ is centrally pivoted upon the said bracket and carries at its outer end the switch-blade $D^2$ of the switch D. In the position shown in Fig. 1 this armature is horizontal and the switch is open, such position being maintained by the spring $E^3$. When, however, the magnet becomes energized, its attraction for its armature causes the latter to swing about its pivoted point, and thereby close the switch D by bringing the blade $D^2$ into contact with the terminal springs of the switch. By this means the dynamo will be connected up to the main circuit whenever its speed reaches a point that will give a predetermined potential upon the magnet E. This throwing in of the dynamo therefore depends immediately upon the attained potential of the dynamo and only indirectly upon the speed.

To open the switch D, there is upon the magnet E a coöperating coil $E^2$, containing a few turns of coarse wire, which coil is included in the main circuit of the dynamo A on the battery and lamp side of the said switch and is therefore closed by the switch. The main current then flows through this coil so long as the dynamo-potential exceeds the counter-potential of the battery. When, however, the two potentials are exactly equal, no current flows through the coil and the switch is held closed by the shunt-coil E' alone; but in the event of a fall in the dynamo-potential there is a reverse flow of current from the batteries through the series coil $E^2$, which neutralizes the effect of the shunt-coil E', and so releases the switch and permits it to be opened by spring $E^3$. By this means the main switch will be closed when the dynamo reaches the given potential and will remain closed so long as that potential is equal to or greater than the counter-potential of the battery.

Turning next to the regulation of the dynamo, I make such regulation dependent upon a determining potential-magnet F, which is wound with a shunt-coil F', which, like the shunt-coil of the magnet E, is connected across the main circuit on the dynamo side of the switch D by a branch circuit starting at the point 5 and passing through the coil to the point 3. This potential-magnet sets the standard potential to which the dynamo is to be regulated; but, as I have already mentioned, this standard potential is adjusted from time to time according to the conditions of the storage battery, and to this end I wind upon the magnet F a few turns of coarse wire, forming a coil $F^2$ in series with the storage battery, being contained in the branch circuit $d^2$, which passes from the main line through the battery in multiple with the branch circuit $d'$, passing through the lamps. This series coil $F^2$ coöperates with the shunt-coil $F'$ and causes it to respond to a somewhat-lower voltage whenever a heavy circuit flows into the battery, such as would flow when the charging of the battery was begun. On the other hand, when the battery is nearly charged and little or no current is flowing into it there is a corresponding reduction of the current in the adjusting-coil $F^2$ and a corresponding reduction in its modifying effect on the potential coil $F'$. This enables me to adjust automatically to a slight degree the standard potential which is to be maintained by the regulating-coil F. Another adjustment to establish the differential pressure upon the battery and lamps which I have above referred to is made by adjusting the tension of the retractile spring G in a manner to be hereinafter described. The last-mentioned adjustment, however, only occurs when the dynamo first comes into action, while the former adjustment is dependent upon an entirely different matter—to wit, the condition of the storage battery—and occurs as the determining conditions may demand. For example, in a long uninterrupted run the batteries may become fully charged very quickly, and thereafter during the continuance of the run no current will flow into them, and there will be no modification or adjusting effect of the coil $F^2$. If, however, there are frequent and long-continued stops, which will draw heavily upon the batteries, they may become nearly exhausted, so that the dynamo at starting would send into them a heavy current, which would cause the described modifying or adjusting action by the coil $F^2$. This enables me to adapt the rate of charging the batteries to the formula prescribed by the battery-maker as a rate which will give the best and the guaranteed results, while the variation will not affect the lamps, because it is not violent, and the effect thereof upon the lamps is prevented by the differentiating devices to be hereinafter described.

The magnet F is of the solenoid type, having a core A suspended at one end by a link I and at its other end jointed to the shorter arm of an angle-lever J. The retractile spring G is attached to the lever J at one end, and at its other end it is attached to the vertical arm of the angle-lever K. The magnet F controls the circuit of the regulator-motor L by means of contacts operated by the lever J. On the outer end of this arm is a carbon block O, which plays between the two carbon contacts $f'$ $f^3$, the former constituting a terminal of one of the two field-magnet circuits which are wound differentially upon the motor L and the latter being an intermediate contact resting normally by the pressure of the springs M against the contact $f^2$, which constitutes the terminal of the other differential field-magnet circuit. The contact $f^3$ is also upheld by one end of the lever N, normally drawn upward by a tension-spring $N'$, but having its opposite ends engaged and raised by a pin P on the rheostat when in its off position. The lever J also constitutes one part of the shunt-circuit which contains the motor L, such circuit being connected across the main-line circuit on the battery side of the main switch D, so as to be maintained in operation when the said switch is open. Starting at the point 6, it passes through the armature of the motor by way of a centrifugal circuit-breaker Q, and thence through one or the other of the oppositely-wound field-magnet coils to one of the contacts $f'$ or $f^2$, and thence by the contact O to the lever J, and from there to the opposite sides of the circuit at the junction-point 7.

When the dynamo is at rest, the rheostat will be in its off position, with the pin P holding the outer end of lever N turned down against the tension of the spring $N'$, so as to free the contact-block $f^3$ from the lever. At the same time the magnet F will be deënergized, and the retractile spring G will hold the outer end of the lever J depressed, so as to bring the contact O against the contact $f^3$ and press it downward against the force of the spring N, which breaks the connection between it and the contact $f^2$. This will leave the motor-circuit entirely open. When, however, the dynamo starts up, it will soon attain a speed which, since its field-magnet circuit $a$ is permanently closed, will develop a potential at its armature-terminals sufficient to energize the shunt-magnet $E'$, to close the switch E, and also to energize the shunt-coil of the regulator-magnet F. This will cause the magnet F to draw in its core H against the force of the spring G and allow the contact $f^3$ to come against the contact $f^2$, and thereby close the circuit of the motor L, which will not, however, rotate, since it is already in its off position, which is the position toward which the motor tends to rotate it when energized by the field-magnet terminating at the contact $f^2$. A slight additional movement of the core H serves to separate the contact O from the contact $f^3$ and open the circuit of the motor L. This will be the normal situation when the potential is at the standard point, with the regulator-magnet F holding the contact O free from either the contact $f^3$ or $f'$, as shown in the drawings. A departure from this standard potential will cause the magnet to close the motor-circuit through one of its field-magnet coils or the other, and so rotate it in one direction or the other to produce a regulating action of the rheostat which will correct the departure from the standard voltage. Assuming the dynamo A to continue increasing in speed, the core H will be drawn in because of the increased potential, the lever J will lift contact O against contact $f'$ and close the circuit of motor L, which will begin to rotate the rheostat away from the off position. The effect will be as follows: First, the motor will introduce resistance into the lamp-circuit step by step and simultaneously adjust step by step the tension of the retractile spring G; second, as the speed increases still further the motor will begin to throw resistance into the field-magnet circuit, leaving the dynamo at its highest standard potential, operating upon the battery directly and upon the lamps through a resistance.

Prior to the starting of the motor L the branch circuit $d'$, leading to the lamps, is extended from the positive brush of the dynamo to the contact-segment $S^2$ of the rheostat, to the terminal contact-points $t^3$ and $t^4$ of the resistances T and T', and thence directly by the wires $b$ and $b'$ to the lamps B and B', respectively. Obviously this route included none of the resistances T and T'. The first movement of the rheostat turns the arm R' to the left, so as to throw a section of resistance T into series with the group of lamps B and a section of resistance T' into series with the group of lamps B'. Simultaneously therewith the cam R, fixed to the arm R', presses downward upon the branch K' of the angle-lever to which the adjusting-spring D is anchored, and thereby throws the branch K to the left, with the effect of increasing the tension upon spring G. This adjusts the standard of voltage which will be preserved by the potential magnet F so long as the dynamo speed does not increase. For example, assuming that the dynamo has been connected to the circuit at sixty volts, which is the normal lamp-pressure, and has been feeding the lamps at that pressure in multiple with the batteries which also feed the lamps at the same pressure, the adjustment just mentioned, due to an increase of dynamo speed, will set the magnet F to work at sixty-two volts, whereupon the dynamo will start feeding the batteries, since its potential has been raised two volts above the battery-pressure, and it will also feed the lamps through the section of resistance which reduces the dynamo-pressure to sixty volts at the lamps. By this means the dynamo-current has been "insinuated," so to speak, into the lamps, which had previously been fed by the battery. In other words, the lamps have been transferred from the battery to the dynamo without any change in the voltage applied to them, and the dynamo has also been compelled to feed into the batteries to restore their charge. This condition will be maintained until the dynamo gains still more in speed, when another section of resistance will be thrown into the respective lamp-circuit and the magnet F again adjusted for a potential of sixty-four volts. This action will be continued step by step until the dynamo-pressure reaches seventy volts, when the arm R' will rest upon the contacts $t'$ and $t^2$ of the respective resistances T and T', and the adjusting effect of the cam R upon spring G reaches its limit, and thereafter the magnet F will regulate for seventy volts by throwing the resistance $T^2$ into the field-magnet circuit of the dynamo whenever that pressure is exceeded and cutting out such resistance whenever that pressure is not maintained by the dynamo. The adjustment of spring G compels this action, since the magnet would, if the spring G had been left adjusted for sixty volts, bring the arm R' clear around to the position shown in Fig. 2 in order to regulate at the sixty volts. By means of the adjustment, however, the dynamo is regulated at seventy volts over its ordinary range of working speed by means of the resistance $T^2$ in its field-magnet circuit. The said field-magnet circuit is connected by the wire $a$ to contact-segment S', upon which the rheostat-arm R', connected to the main line, also bears, so that no resistance is included in the field-magnet circuit until the arm R' passes off from the resistances T and T', when its rear end leaves the segment S', and the field-magnet circuit then passes to the arm R', first through the small resistance $T^3$, and then through the said resistance $T^3$, and also through as much of the resistance $T^2$ as may be included therein by the continued movement of the arm R'.

On the shaft of the motor L is a centrifugal governor Q, which opens the motor-circuit when a definite speed is reached, this feature being employed in my former system above mentioned, and shown in prior applications for Letters Patent. The object of it is to steady the action of the motor L by preventing its "racing" in either direction, with the objectionable "hunting" and the continuous vibration of the rheostat-arm thereby produced.

The general apparatus herein shown is embraced by claims made in other applications, and the present case is limited to the improvement herein described and claimed, it being understood, however, that such improvement is but illustrated by the devices shown, which disclose the form which I now regard as the best one out of the various possible forms in which the invented improvement may be embodied.

What I claim as new, and desire to secure by Letters Patent of the United States, is—

1. In an electric-lighting system, the combination with a variable-speed dynamo, of electric lamps operated thereby in groups, a switch for connecting the dynamo to the circuit when the lamp-potential is reached, a regulator for the dynamo set to operate at a higher pressure, and a plurality of resistances in the respective lamp-circuits simultaneously controlled by the said regulator.

2. In an electric-lighting system, the combination with a variable-speed dynamo of electric lamps divided into groups, a storage battery charged by the dynamo in multiple with the lamps, a resistance in series with each lamp group and switches controlling the circuits of the several groups respectively.

3. In an electric-lighting system, the combination with a variable-speed dynamo of electric lamps in groups adapted for a given pressure connected thereto, a regulator maintaining the dynamo-pressure at a point higher than the lamp-pressure, a storage battery in multiple with the lamps, individual resistances in each of the several lamp-circuits and switches controlling the same lamp-circuits respectively.

4. In an electric-lighting system the combination with a variable-speed dynamo of a regulator therefor, a magnet measuring the potential and controlling the said regulator in accordance therewith, a storage battery in the dynamo-circuit, electric lamps connected in groups to the said circuit in multiple with the battery, a starting-switch for connecting the dynamo to the line, a series of resistances arranged in the several lamp-circuits respectively and governing devices for said resistances controlled by the starting and stopping of the dynamo-current flowing to the line.

5. In an electric-lighting system the combination with electric lamps arranged in a plurality of multiple circuits and a storage battery, of a dynamo feeding the lamps and battery in multiple but at a pressure higher than that required for the lamps, potential-reducers for each of the several lamp-circuits respectively and switches controlling the said circuits.

6. In an electric-lighting system, the combination with a variable-speed dynamo, of electric lamps and storage battery operated therefrom, a regulator-motor operated by the storage battery, a circuit-breaker between the battery and the said motor operated by the motor itself, a potential-magnet, a retractile spring therefor, contacts operated in one direction by the spring and in the other direction by the magnet, and a mechanical connection from one of said contacts to the regulating-rheostat for controlling its position.

Signed at Albany, New York, this 11th day of September, 1901.

JAMES F. McELROY.

Witnesses:
ERNEST D. JANSEN,
CHAS. L. WIRT.